Oct. 11, 1955  L. D. STATHAM  2,720,113
PRESSURE MEASURING DEVICES

Filed Feb. 28, 1949  4 Sheets-Sheet 1

INVENTOR.
LOUIS D. STATHAM
BY Philip Subkow
ATTORNEY.

Oct. 11, 1955     L. D. STATHAM     2,720,113
PRESSURE MEASURING DEVICES
Filed Feb. 28, 1949     4 Sheets-Sheet 2
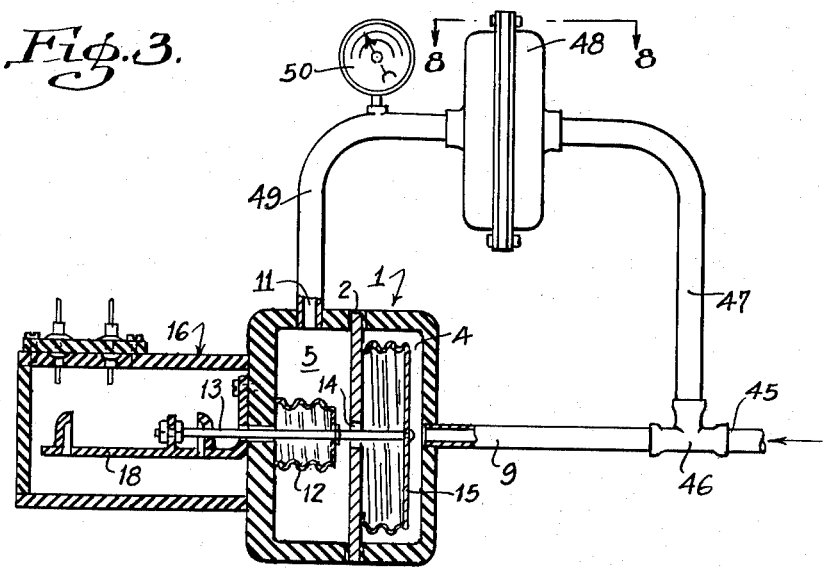
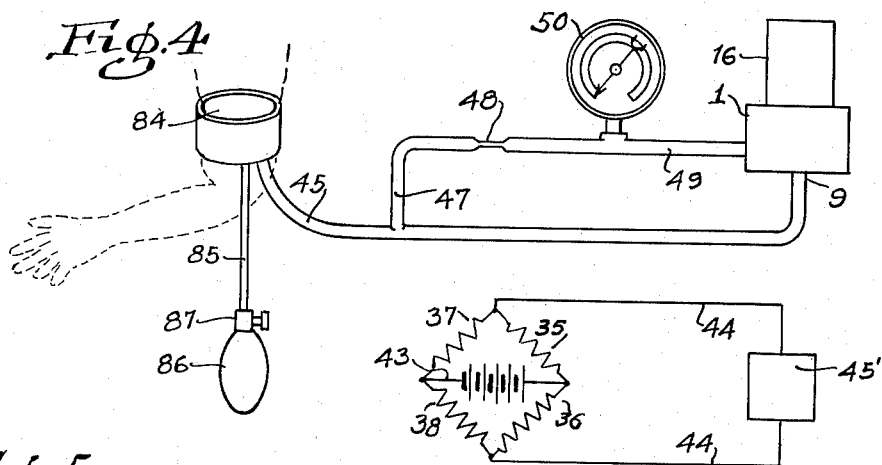
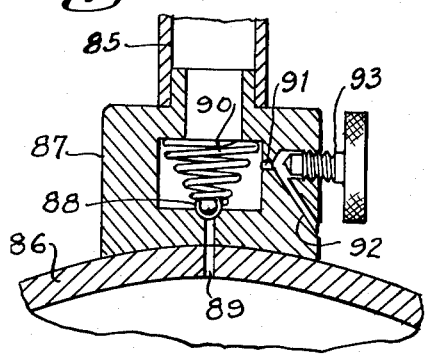
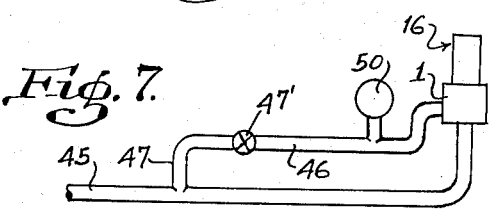
INVENTOR.
LOUIS D. STATHAM
By Philip Subkow
ATTORNEY.

Oct. 11, 1955     L. D. STATHAM     2,720,113
PRESSURE MEASURING DEVICES
Filed Feb. 28, 1949     4 Sheets-Sheet 3
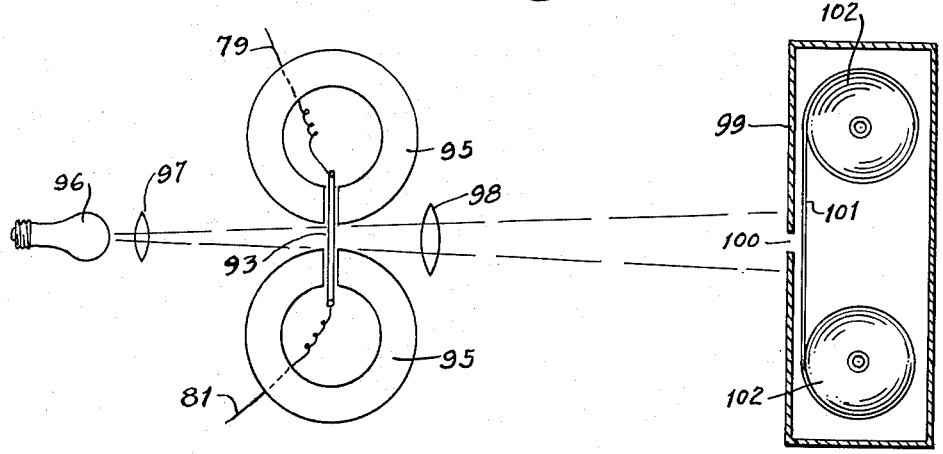
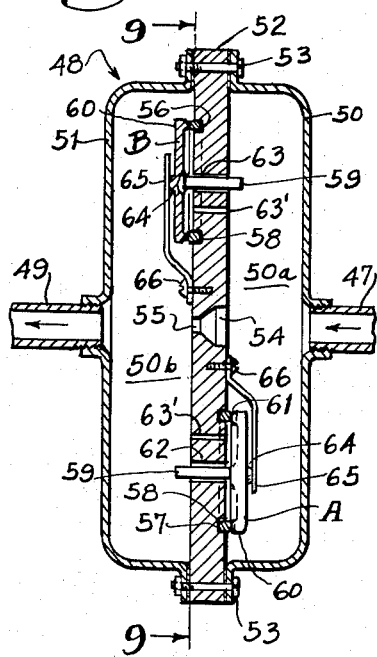
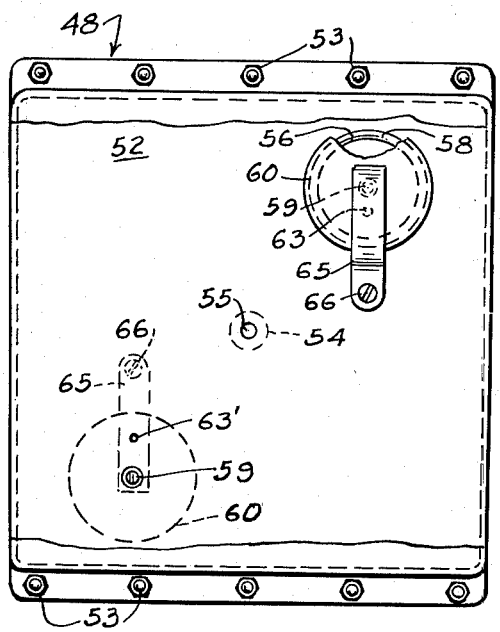
INVENTOR.
LOUIS D. STATHAM
BY Philip Subkow
ATTORNEY.

Oct. 11, 1955      L. D. STATHAM      2,720,113
PRESSURE MEASURING DEVICES

Filed Feb. 28, 1949      4 Sheets-Sheet 4

INVENTOR.
LOUIS D. STATHAM
BY Philip Subkow
ATTORNEY.

United States Patent Office 2,720,113
Patented Oct. 11, 1955

2,720,113

PRESSURE MEASURING DEVICES

Louis D. Statham, Beverly Hills, Calif., assignor to Statham Laboratories, Inc., Beverly Hills, Calif., a corporation of California Application February 28, 1949, Serial No. 78,746

20 Claims. (Cl. 73—398)

This invention relates to a pressure responsive device, and particularly to a pressure transmitter for a gauge such as an electrical resistance strain gauge.

It is particularly directed to the measurement and recordation of pressure and pressure fluctuations or pulsations of a fluid.

It is more particularly directed to the measurement and recordation of the total pressure and of the fluctuations of such pressure where such pressure fluctuations are in magnitude but a small fraction of the average fluid pressure, although it may also be adapted for use when the pressure fluctuations are large compared to the average fluid pressure.

While it may be applied to many uses where such fluid pressures and pressure variations are to be measured and recorded, it finds one of its most useful applications in the measurement and recordation of pulsating blood pressure and blood pressure variations.

In general my device comprises two fluid pressure sensitive mechanisms, one of said mechanisms being insensitive to the fluid pressure fluctuations and the other being sensitive to fluid pressure fluctuations and simultaneously measuring the resultant effects of said pressure and pressure variations on said device, preferably by superimposing said effects upon a single gauge element with means for selectively and separately recording the said pressure and the pressure fluctuations.

In my preferred embodiment I employ fluid pressure transmitting means in the form of pistons or diaphragms, preferably the latter. The diaphragms are conveniently in the form of bellows, and one of said bellows is exposed to the pressure fluctuations and made sufficiently sensitive to respond to the pressure fluctuations. I interpose between the variable fluid pressure source and the second of the bellows a fluid pressure filter which will transmit the average or static pressure of the fluid stream but will not transmit the fluctuations of pressure resulting from the variations of fluid flow occasioned by such pulsations. Preferably for this purpose I employ a restriction in the line between such variable fluid flow and said second bellows. The restriction is in the form of a fine orifice or choke whose diameter and length are such that while it will transmit the static fluid pressure, it will not transmit the fluctuations of pressure at the frequency with which they occur at the upstream side of the orifice so as to cause any perceptible variations in pressure in the volume on the downstream side of the orifice. The orifice thus acts as a filter for the fluctuations of pressure preventing their transmission to the bellows. Such bellows will then record the average or static pressure only.

It will be found that the dimensions of the orifice or choke will vary both with the frequency of the fluctuations and amount of attenuation of the fluctuations which it is desired to obtain. By increasing the flow resistance through the choke (which has sufficient flow resistance to act in this manner) by either increasing its length and preferably by reducing its diameter or by increasing the volume of the fluid system on the downstream side of the choke, I may increase the degree of attenuation, and by increasing the resistance and/or volume sufficiently I may get a virtual suppression of the fluctuation. A choke system of this character may be termed a low pass resistance capacitance pressure fluctuation choke or filter in analogy to electrical usage.

I have found that the use of wire strain gauges which have low inertia and high sensitivity are ideally suited for the measurement of such small pressure variations imposed upon an average or static base pressure of considerable magnitude, as in the measurement of blood pressure in humans. Such wire strain gauges are described in my Patents No. 2,453,549 and No. 2,453,551.

I shall therefore describe the preferred embodiment of my invention shown in the accompanying drawings when used with one form of such strain gauges as an illustration of my invention.

In employing such a strain gauge in combination with a bellows subject to fluctuating pressure and sufficiently sensitive to minor pressure fluctuations, the movement of the bellows under the higher base pressure would have the tendency to over-stress the wires of the strain gauge or to move the armature of the wire strain gauge against the limit motion stop usually employed to prevent such excessive strain. I therefore balance the bellows used to measure the fluctuating pressure so that it is subjected on one side to the static pressure and on the other to the fluctuating pressure and transmit the displacement of the bellows resulting from the difference, i. e., merely from the fluctuations of pressure, to the strain wire gauge, thus permitting the variation of strain to be within the permissible stress limits so that the gauge is operative throughout substantially the whole region of pressure fluctuation. I provide a second bellows which is connected to the fluctuating pressure source through a low pass resistance capacitance pressure fluctuation filter so that the bellows is subjected to the average, i. e., static, pressure only, and transmit the displacement of the latter bellows to the gauge and superimpose the said displacement upon the displacement of the bellows which is responsive to pressure fluctuations. I so proportion the several displacements that the resultant variation in strain on the wire is within the permissible or operative limits of said gauge.

I also employ electrical circuits, measuring and recording means whereby the output of the bridge of which the gauge forms a part will discriminate between and separately record the variation in the strain in the wires of the strain gauge resulting from the average static pressure and from the fluctuations in pressure.

These and other objects of my invention will be further described in connection with the following description taken together with the drawings, in which Fig. 1 is a vertical section of the pressure transmitter of my invention;

Fig. 3 is a view partially in section and partially schematic, showing the arrangement of my transmitter and the pressure fluctuation filter;

Fig. 4 is a view partly schematic showing its application to the measurement of blood pressure;

Fig. 5 is a detail of the construction of the bulb valve;

Fig. 6 is a wiring diagram of the strain gauge bridge;

Fig. 7 is a schematic showing of another modification of the connection of the pressure transmitter to the fluctuating pressure source;

Fig. 8 is a section taken on line 8—8 of Fig. 3;

Fig. 9 is a section taken on line 9—9 of Fig. 8;

Fig. 12 is a schematic showing of one form of recording device.

Figure 1:
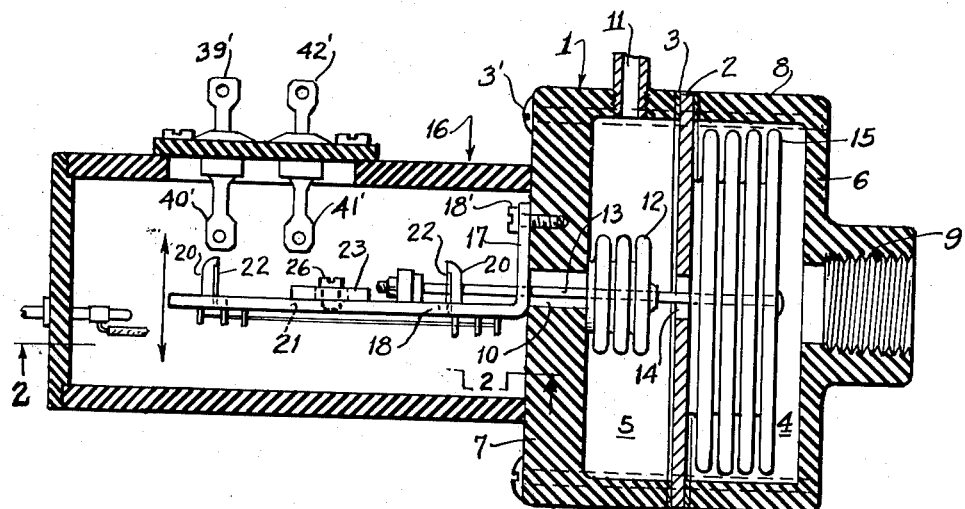
Figure 2:
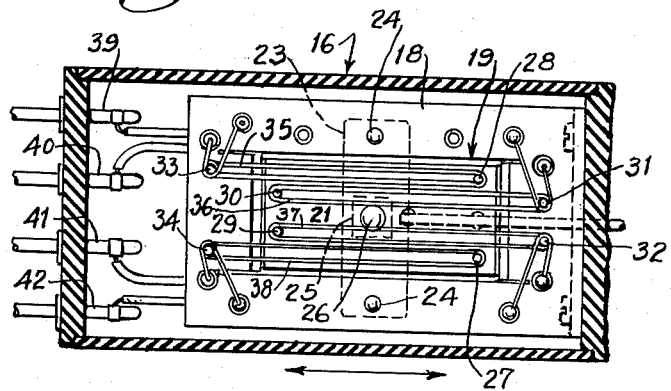
Fig. 2 is a partial fragmentary section taken on the line 2—2 of Fig. 1.

The pressure transmitting device is comprised of a pressure transmitting section 1 and an electrical strain gauge chamber 16. The section 1 has a transverse partition 2, held by suitable screws 3' and by suitably fluid pressure-tight gaskets 3 to divide section 1 into two chambers 4 and 5 having end walls 6 and 7 and a wall 8. A pressure inlet 9 is provided in wall 6 and a bore 10 is provided in wall 7. A fluid pressure inlet 11 is provided in the wall 8 at chamber 5. Mounted over the opening 10, and upon the wall 7 is a fluid-tight bellows 12 to which is connected a rod 13 which passes through the bore 10 and extends through a bore 14 in the partition 2 and is connected to the large bellows 15 mounted on the partition and over the bore 14 by a fluid-tight connection. It will be observed that the bellows 15 is larger than bellows 12 in the sense that the area of the bellows 15 subjected to pressure in chamber 4 is greater than the area of 12 which is subjected to pressure in chamber 5. It will be observed that the bellows 12 and 15 are each axially movable, i. e., movable in the direction of the axis of the diaphragm, to be truly responsive to fluid pressure imposed on them within the operative range of pressures here considered. It will also be observed that the bellows 15 is subjected to the pressure in chambr 4 on one side (outside) thereof and to the pressure in chamber 5 transmitted through bore 14 to the interior of the bellows 15 so that the deflection of the bellows 15 is the result of the difference between the pressures in chambers 4 and 5. The bore 10 is connected to chamber 16 which may be held at a constant pressure, conveniently atmospheric pressure.

A strain sensitive unbonded resistance wire gauge is mounted in chamber 16. I may employ, for example, the form of gauge shown in United States Letters Patent No. 2,453,549 or in No. 2,453,551. In both forms the motion of the armature to which the force to be measured is applied is limited by a stop in order to prevent overstraining of the wires. The gauge is thus not operative with forces greater than those sufficient to move the armature against such stop in the sense that forces in excess of such magnitude are not recorded. The form illustrated in the accompanying drawing is the form shown in Patent No. 2,453,551.

The bracket 17 is mounted by screws 18' on the wall 7 and is formed integrally with the frame 18 carrying a central rectangular hole 19 and upstanding plates 20. The armature 21 is suspended in the hole 19 by leaf springs 22 connected to plates 20.

A plate 23 is mounted on one side of the frame 18 by means of screws 24, across the opening 19, and carries a square hole 25. The armature 21 carries a stud 26 which passes through the hole 25, the hole and stud acting as a motion limit stop for the armature. The armature 21 carries electrically insulated pins 27 and 28 at one end thereof and electrically insulated pins 29 and 30 at the other end thereof. The frame 18 carries like pins 31 and 32 at one end and like pins 33 and 34 at the other end thereof. Electrical strain wires are wound in coils under tension, coil 35 being mounted on pins 28 and 33; coil 36 on pins 31 and 30; coil 37 on pins 29 and 32; and coil 38 on pins 34 and 27. These coils are connected by suitably insulated electrical connections to the insulated outlets 39, 40, 41, and 42. The unit is enclosed in chamber 16.

The wires may be connected to a conventional Wheatstone bridge. Fig. 6 illustrates the corresponding wires of the strain gauge, being shown as the resistances of the Wheatstone bridge, the four wire loops forming the four arms of the Wheatstone bridge. As is conventional, the usual potential source is shown at 43 and the galvanometer or other meter is shown at 45' connected across the output 44—44 of the bridge.

The connection of the gauge to the source of fluid pressure is shown in Figs. 3 and 4. The tube 45 is connected to the source of fluid pressure and connected to 9 through a T 46, the run of the T being connected to 9 and the branch being connected by tube 47 through a restricted orifice such as a capillary passage 48 of reduced diameter, i. e., much smaller than the internal diameter of 47 or 45, and to a tube 49 which is connected to inlet 11. If desired a pressure gauge 50 may be provided in the line between the chamber 5 and the orifice 48.

The bellows 15 is actuated by the difference in pressure exerted on both sides of the bellows, that is, it is responsive to the fluctuations in pressure. The pressure in chamber 5 is only the static or average pressure. If the fluctuations are in magnitude much less than the pressure in chamber 5, I make the bellows 15 much greater in area than bellows 12 so that the net displacement of the rod 13 under the influence of the static pressure in 5 and the fluctuating pressure in 4 are not sufficient to move the armature so that the pin 26 is against the back of the hole 25. Thus, the strain gauge is maintained in its operative range.

I have obtained this effect by my novel method of balancing out the static or average pressure to cause the actuation of the bellows 15 by means of the pressure fluctuation only. This may be accomplished by employing the low pass resistance capacitance pressure fluctuation choke shown schematically in Figs. 3 and 4. As an alternative procedure I may place a shut-off valve 47' in the line 47 and not rely on the choke 48. This is schematically illustrated in Fig. 7.

In employing the choke it is desirable to provide means for a rapid development of the static pressure in chamber 5 and also to prevent the accumulation of pressure in chamber 5 above the static pressure in line 45.

I have provided a useful arrangement which is illustrated in Figs. 8 and 9. The unit 48 is composed of housings 50 and 51 separated by a plate 52 which is clamped between 50 and 51 by suitable bolts 53 and sealed with suitable gaskets. The housing 50 carries a boss threaded to receive the tube 47 and the housing 51 carries a boss bored to receive the tube 49. The plate 52 is bored at 54 and counterbored with a fine bore of capillary dimension at 55. Positioned on either side of the bore 54 are bores 62 and 63. Ring grooves 56 and 57 are formed on opposite sides of the plate concentric with each of the bores 62 and 63. An O ring 58 is positioned in each of said grooves.

Through each of the borees 62 and 63 passes a stem 59 of the oppositely faced valves A and B. The valves A and B are each composed of a plate 60 carrying circumferential ridges 61 concentric with the stem 59, the ridges resting on the circular O rings 57 and 58. Each outer face of each of the plates 60 carries a boss 64 against which is pressed the leaf spring 65 which is anchored on the plate 52 by the screw 66. Each of the plates 60 covers a bore 63'.

In the operation of my pressure transmitter when employed on a fluctuating pressure source, for example, in measuring the pulsating pressure output of a pump such as a compressor, the line 45 is connected to the output of the pump. When employing valve 47' and not employing the choke 48 chambers 4 and 5 are subjected to the pressure in line 45. Valve 47' is now closed. Chamber 5 is now under substantially the mean of the pressure in line 46. This mean pressure is exerted through 14 on the inside of the bellows 15 and upon the bellows 12. However, chamber 4 is subjected to the pulsating pressure which is composed of two components, the static pressure plus the cycles of pulsation of pressure which are superimposed thereon. Since the static pressure is the same in chambers 4 and 5, the bellows 15 oscillates only under the fluctuations of pressure, i. e., it is subjected only to the cycles of variation of the dynamic head in line 45.

Thus rod 13 is moved to the left by the compression of the bellows 12 and caused to reciprocate back and forth by means of the breathing of the bellows 15. The relative magnitude of the displacement influenced by the bellows 12 and 15 will depend (for a given pressure and pressure fluctuation) upon the ratio of the areas of the faces of the bellows 12 and 15 and by this means I can change the relative effect of the static pressure and the fluctuating pressure on the displacement of the rod 13 and thus amplify or minimize the effect of the static pressure or fluctuating pressure.

The oscillation and reciprocation of the rod 13 causes a reciprocation of the armature 21 and an alternate increase or diminution of the tension on wires 35 and 38 with a reverse decrease or increase in the tension of the wires 36 and 37.

I obtain a like result automatically and without operation of the valve 47' by using the choke 48, in which case I need not employ valve 47'. Its operation will be explained by reference to the form illustrated in Figs. 8 and 9.

The line 47 is connected to chamber 5 through the bore 55. Thus chamber 5 is subjected only to static pressure and chamber 4 to the static pressure on which is superimposed the pressure fluctuations. The gauge acts similarly to that described above.

This gauge is particularly adaptable to measurement of low pressure heads, as, for example, to the measurement of human blood pressure and the blood pressure pulses, and its operation will be illustrated by reference to this service.

Figs. 8 and 9 illustrate a choke particularly adapted to such service. The line 45 is connected to the conventional cuff employed in ordinary manometer blood pressure measurements. Since nearly everyone has had blood pressure taken, it will be merely necessary to indicate the structure of this cuff schematically, as shown in Fig. 4. It is, as will be recognized, merely an inflatable bag 84 which is wrapped tightly around the leg or arm, the interior of the bag being connected to tubes 45 and 85 which are in turn connected through a fitting 87 to the inflating bulb 86. The fitting carries a ball check valve 88 which closes the aperture 89 under the influence of the spring 90. An air vent 92 is connected to orifice 91 on the downstream side of the ball 88. The vent 92 is under the control of the needle valve 93. The bulb, with valve 93 closed, pumps the cuff to a pressure usually above the systolic and diastolic pressure. In order to protect the gauge, I have provided suitable pressure relief valves in combination with the choke such as is illustrated in Figs. 8 and 9 and described above.

As the bulb pressure increases, the pressure in chamber 50a of the unit of Fig. 8 rises and there is a slow leak through 55, but since the pressure rise in 50a, due to rapid manipulation of the bulb, may be at a rate greater than the leak through 55, the pressure differential across the plate 52 may be sufficient to unseat the valve B, thus causing a rapid equalization of pressure in chambers 50a and 50b.

As is conventional in blood pressure measurements, the pressure in 84 is dropped by opening of the valve 93 to the systolic heart pressure. This may drop the pressure in 50a sufficiently rapidly so that the pressure differential across the plate 52 is sufficient to unseat the valve A. In this manner the pressure in chambers 5 and 4 is rapidly brought to the static pressure established in the cuff, which in blood pressure measurement will be the pressure of the heart. Upon this pressure is superimposed the pulse pressure of the heart beat. The orifice 55 is of capillary dimension and its diameter and length bear the relationship to the downstream volume, i. e., chamber 50b, line 49 and chamber 5, such that at the frequency of the pulse beat substantially no transmission of the pulse pressure variation through the capillary is obtained. Chambers 50b and 5 are subjected only to the initial static pressure established by the bulb, i. e., the heart pressure.

As described previously, the diaphragms or bellows 12 and 15 are so proportioned that an amplification of the fluctuating pulse pressure is obtained and the proper proportioning of this pressure to the static pressure in 5 is obtained. The rod 13 moves to the left for a distance determined by the bellows 12 and oscillates about that position under the breathing of 15 influenced by the pulsating pressure in 4. The resultant output of the bridge will be a variable direct current potential which is proportional to and in phase with the variable displacement of the rod 13.

I have devised an electrical measuring unit which will measure both the displacement of the rod 13, due to the static pressure in 5, and the oscillation of 13 due to the fluctuating pressure in 4. In order to accomplish this purpose I vary the basic bridge circuit of Fig. 6 by introducing standardizing resistors and a filter circuit which will selectively suppress the variation of the direct current of the bridge output and measure only that portion of the direct current output of the bridge which is caused by the displacement of 13 under the influence of the static pressure in 5. I may also provide means for measuring the total direct current output of the bridge or measure the variation only.

Figure 10:
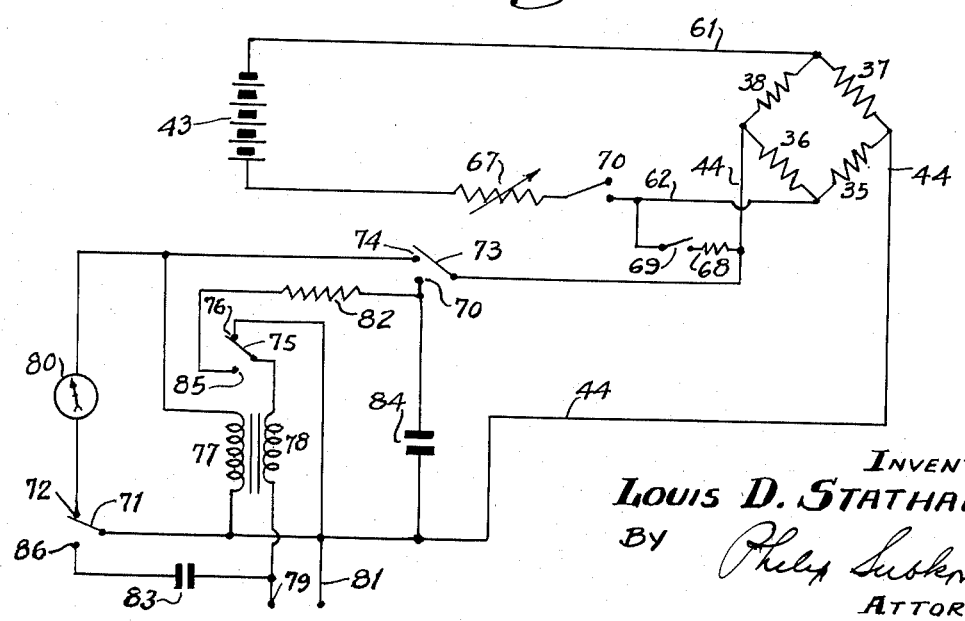
Fig. 10 is diagrammatic showing of one form of electrical connection of the gauge to the recording system.

In Fig. 10, the bridge 35, 36, 37, and 38 composed of the wires of the resistance strain wire gauge is provided with, as is conventional in such gauges, the standardizing resistances 67 and 68. Switches 69 and 70 are provided in series respectively with resistances 68 and 67. These resistances are adjusted to establish the desired sensitivity of the bridge. Resistance 68 is established to give a bridge unbalance equivalent to an armature deflection resulting from an arbitrarily chosen pressure, which bridge unbalance will give for such arbitrarily chosen pressure a desired deflection of the recording instrument. After this adjustment, switch 69 is opened and remains open until a new standardization is desired. With switch 70 closed and 69 open, with the switch 71 on contact 72, switch 73 on contact 74, and switch 75 on contact 76, the output 44—44 is connected to the microammeter 80 and across the primary 77 of a transformer. The secondary 78 of the transformer is connected to the terminals 79 and 81. Resistance 82 and capacitances 83 and 84 are out of the circuit. The terminals 79 and 81 may be connected to any recording galvanometer, as, for example, the string galvanometer such as is used in conventional electrocardiographs, illustrated schematically in Fig. 12. The spring 93 is connected to the outputs 79 and 81 and operates under the influence of the permanent magnet 95. A convenient light source 96 and a lens system 97 and 98 focus the light beam on the slit 100 of the housing 99 across which a suitable photographic strip 101 is moved by a constant speed motor which actuates the rolls 102. The details of this mechanism are not further illustrated since it is conventional and well known.

With the switches 73, 71, and 75 in the position shown in Fig. 10 and switches 70 closed and 69 open, and the bridge balanced, the output of the bridge is measured by the direct current microammeter 80. By selecting a meter with a period which is long as compared to the fluctuations of potential across the bridge output 44—44 (i. e., compared with the period of pulse pressure in 4) the meter will measure only the bridge output occasioned by the displacement of the rod 13 under the influence of the pressure in 5. The meter can be omitted and the pressure measured on gauge 50 directly.

The fluctuating potential across 44—44 resulting from the oscillation of the rod 13 under the influence of the variable pulse pressure in 4 is impressed across the primary 77 of the transformer, and the secondary 78 matches the impedance of the recording circuit. There is thus recorded on the strip 101 only the fluctuations of the potential across 44—44 resulting from the pulse pressure in 4.

If it is desired to record both the pressure in 5 and the variable pressure in 4, a recording galvanometer of conventional design may be introduced in the place of meter 80.

By connecting the switch 73 to contact 70 and switch 75 to contact 85 and switch 71 to contact 86, the meter 80 is cut out of the circuit and the bridge output 44—44 is connected directly to the terminals 79 and 81 through the resistor 82 and the secondary 78 of the transformer. The capacitances 84, 83, together with the resistance 82 and secondary 78, act as a low pass filter to prevent any substantial transmission of the variation of fluctuating current across 44—44 resulting from the fluctuating pressure in 4 and only the direct current resulting from the displacement of the rod 13 under the influence of the static pressure 5 will be recorded. In this circuit, the secondary is always in the galvanometer circuit and the primary 77 is cut out as described above. On switching to cut out the primary, a surge potential is impressed upon the galvanometer, giving a deflection which has no relation to the measured pressure.

Figure 11:
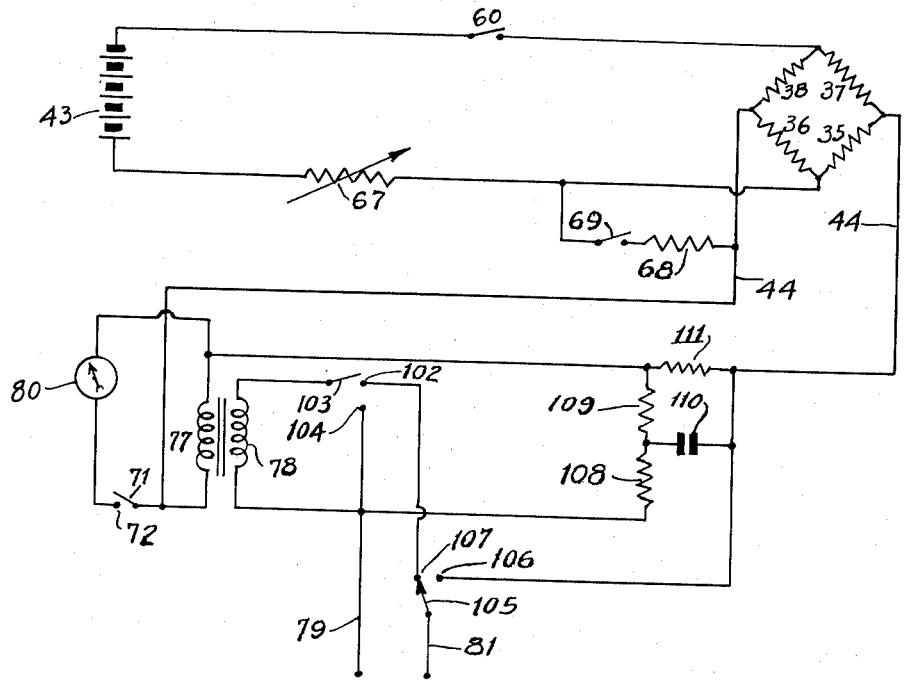
Fig. 11 is another form of the connection illustrated in Fig. 6.

Fig. 11 shows a modification of the circuit 10, in which the undesirable surge on switching is avoided by maintaining the primary in the bridge circuit when measuring both the fluctuating and steady direct current output of the bridge.

The primary 77 of the transformer is connected across the line 44—44 through a resistance 111. The meter 80 may be shunted across the primary 77 through the switch 71 and contact 72. The secondary 78 is connected to the line 79. The other side of the secondary is connected to 81 through the switch system 103 and 105. The filter composed of the resistances 109 and 108 and the condenser 110 across the resistance 111 is placed in the circuit by means of the switches 105 and 103 to remove the fluctuating direct current.

To measure the steady direct current resulting from the base or static pressure, switch arm 105 is on 106 and 103 is on 104. The filters 108, 109 and 110 suppress the fluctuating direct current and pass only the steady direct current which may be also measured in meter 80 by placing arm 71 on contact 72. To measure only the fluctuations in the direct current, the filter is effectively cut out by placing the switch 105 on contact 107 and 103 on 102. The filter is effectively out of the circuit and the bridge output is in series with the resistance 111 and impressed across the galvanometer through the primary 77, the secondary 78 being in the circuit and connected to the terminals of the galvanometer.

With the filter in the circuit, the fluctuations in the bridge output are suppressed. This circuit will thus avoid the switching surges of current of the circuit of Fig. 10, but introduces the attenuating resistance 111.

While I have described a particular embodiment of my invention for the purpose of illustration, it should be understood that various modifications and adaptations thereof may be made within the spirit of the invention as set forth in the appended claims.

I claim:

1. A pressure gauge, comprising a chamber, a diaphragm in said chamber, a port in the wall of said chamber positioned on one side of said diaphragm and adapted for connection to a source of fluid pressure, a second chamber, a second diaphragm in said second chamber, a port in said second chamber on one side of said second diaphragm and adapted for connection to the said source of fluid pressure, a fluid pressure communication between said second chamber on the said one side of said second diaphragm and the other side of said first diaphragm, a port in said second chamber on the other side of said second diaphragm, a mechanical connection between said diaphragms and adapted to move with said diaphragms, means responsive to the displacement of said mechanical connection to indicate the displacement thereof, a conduit connected to the first-named port and adapted for connection to said source of fluid pressure, a by-pass conduit connected to the first-named conduit and the port in said second chamber positioned on the said one side of said second diaphragm, and means in said by-pass conduit for isolating said second chamber from the fluctuations of pressure in said first-named conduit.

2. A pressure gauge, comprising a chamber, a partition in said chamber dividing said chamber into two pressure compartments, a port in said partition, a bellows positioned in one of said compartments and fixed to said partition over said port, a second port in said one of said compartments, a conduit connected to said second port and adapted for connection to a source of fluctuating fluid pressure, a third port, said third port being positioned in the wall of the other of said compartments, a second bellows in said other compartment positioned in the wall of said chamber over the third port, a fourth port, said fourth port being positioned in said other compartment, a rod connecting said bellows, a rod passing through the port over which said second bellows is mounted and connected to said second bellows, said last-named rod adapted to move with said bellows, means responsive to the motion of said last-named rod to indicate the motion thereof, a by-pass conduit connected to the first-named conduit and the said fourth port, and means in said by-pass conduit for isolating said other compartment from the fluctuations of pressure in said first-named conduit.

3. A pressure gauge comprising a chamber, a pair of compartments in said chamber, a diaphragm in said chamber between said compartments and separating said compartments, said diaphragm being subjected to fluid pressure in said chamber on opposite sides of said diaphragm, a fluid pressure conduit connected to each of said compartments, a by-pass connection between said conduit, means in said by-pass connection to isolate one of said compartments from fluctuation of pressure in the other of said compartments, such means comprising a restricted orifice in said by-pass, and means connected to said diaphragm to indicate the deflection of said diaphragm.

4. A pressure gauge comprising a chamber, a pair of compartments in said chamber, a diaphragm in said chamber mounted between said compartments and separating said compartments and subjected to fluid pressure in said compartments on opposite sides of said diaphragm, a fluid conduit connected to each of said compartments, a port in the wall of one of said compartments, a second diaphragm in said one of said compartments, said second diaphragm being mounted over said port for deflection responsive to pressure in said one of said compartments, a by-pass conduit between said fluid conduits, means in said by-pass conduit for isolating one of said compartments from pressure fluctuation in the other of said compartments, and means connected to both of said diaphragms and responsive to the deflection of each of said diaphragms for indicating the deflection of said diaphragms.

5. A pressure gauge comprising a chamber, a pair of compartments in said chamber, a diaphragm in said chamber mounted between said compartments and separating said compartments and subjected to fluid pressure in said compartments on opposite sides of said diaphragm, a fluid conduit connected to each of said compartments, a port in the wall of one of said compartments, a second diaphragm in said one of said compartments, said second diaphragm being mounted over said port for deflection responsive to pressure in said one of said compartments, a by-pass conduit between said fluid conduits, a resistance capacitance choke in said by-pass conduit, and means connected to both of said diaphragms and responsive to the deflection of each of said diaphragms for indicating the deflection of said diaphragms.

6. A pressure gauge comprising a chamber, a pair of compartments in said chamber, a diaphragm in said chamber mounted between said compartments and separating said compartments and subjected to fluid pressure in said compartments on opposite sides of said diaphragm, a fluid conduit connected to each of said compartments, a port in the wall of one of said compartments, a second diaphragm in said one of said compartments, said second diaphragm being mounted over said port for deflection responsive to pressure in said one of said compartments, a by-pass conduit between said fluid conduits, a valve in said by-pass conduit, and means connected to both of said diaphragms and responsive to the deflection of each of said diaphragms for indicating the deflection of said diaphragms.

7. A pressure gauge comprising a chamber, a pair of compartments in said chamber, a diaphragm in said chamber between said compartments and separating said compartments, said diaphragm being subjected to fluid pressure in said compartments on opposite sides of said diaphragm, a fluid conduit connected to each of said compartments, a port in the wall of one of said compartments, a second diaphragm in said one of said compartments, said second diaphragm being mounted over said port for deflection responsive to pressure in said one of said compartments, a by-pass conduit connected between said fluid, means in said by-pass conduit for isolating one of said compartments from pressure fluctuations in the other of said compartments, means responsive to the displacement of said diaphragms comprising an electrical bridge circuit effectively producing fluctuating direct current output in phase with and proportional to the fluctuating pressure, a low-pass resistance capacitance filter in the output of said bridge circuit, said filter adapted to suppress fluctuating direct current output of said bridge, an electrical indicating device connected to the output of said bridge through said filter, and means for selectively and effectively isolating said filter in said circuit.

8. A pressure gauge comprising a chamber, a pair of compartments in said chamber, a diaphragm in said chamber between said compartments and separating said compartments, said diaphragm being subjected to fluid pressure in said compartments on opposite sides of said diaphragm, a fluid conduit to each of said compartments, a port in the wall of one of said compartments, a second diaphragm in said one of said compartments, said second diaphragm being mounted over said port for deflection responsive to pressure in said one of said compartments, a by-pass conduit connected between said fluid conduits, a resistance capacitance choke in said by-pass conduit, means responsive to the displacement of said diaphragms comprising an electrical bridge circuit effectively producing fluctuating direct current output in phase with and proportional to the fluctuating pressure, a low-pass resistance capacitance filter in the output of said bridge circuit, said filter adapted to suppress fluctuating direct current output of said bridge, an electrical indicating device connected to the output of said bridge through said filter, and means for selectively and effectively isolating said filter in said circuit.

9. A pressure gauge comprising a chamber, a pair of compartments in said chamber, a diaphragm in said chamber between said compartments and separating said compartments, said diaphragm being subjected to fluid pressure in said compartments on opposite sides of said diaphragm, a fluid conduit to each of said compartments, a port in the wall of one of said compartments, a second diaphragm in said one of said compartments, said second diaphragm being mounted over said port for deflection responsive to pressure in said one of said compartments, a by-pass conduit connected between said fluid conduits, means in said by-pass conduit for isolating one of said compartments from pressure fluctuations in the other of said compartments.

10. A pressure gauge, comprising a chamber, a first axially movable diaphragm in said chamber, said diaphragm being axially movable responsive to fluid pressure in said chamber, a port in the wall of said chamber positioned on one side of said diaphragm and adapted for connection to a source of fluid pressure, a second chamber, a second axially movable diaphragm, said second diaphragm being axially movable responsive to fluid pressure in said chamber, a port in said second chamber on one side of said second diaphragm and adapted for connection to the said source of fluid pressure, a fluid pressure communication between said second chamber and the other side of said first diaphragm, a port in said second chamber on the other side of said second diaphragm, a mechanical connection between said diaphragms, means connected to both of said diaphragms and responsive to the deflection of each of said diaphragms for indicating the deflection of said diaphragms, a conduit connected to the first-named port and adapted for connection to a source of fluid pressure, a by-pass conduit connected to the first-named conduit and the port in said second chamber positioned on the said one side of said second diaphragm, and means in said by-pass conduit for isolating said second chamber from the fluctuations of pressure in said first-named conduit.

11. A pressure gauge, comprising a chamber, a first axially movable diaphragm in said chamber, said diaphragm being axially movable responsive to fluid pressure in said chamber, a port in the wall of said chamber positioned on one side of said diaphragm and adapted for connection to a source of fluid pressure, a second chamber, a second axially movable diaphragm, said second diaphragm being axially movable responsive to fluid pressure in said chamber, a port in said second chamber on one side of said second diaphragm and adapted for connection to the said source of fluid pressure, a fluid pressure communication between said second chamber and the other side of said first diaphragm, a port in said second chamber on the other side of said second diaphragm, a mechanical connection between said diaphragms, means connected to both of said diaphragms and responsive to the deflection of each of said diaphragms for indicating the deflection of said diaphragms, a conduit connected to the first-named port and adapted for connection to a source of fluid pressure, a by-pass conduit connected to the first-named conduit and the port in said second chamber positioned on the said one side of said second diaphragm, and a valve in said by-pass conduit.

12. A pressure gauge, comprising a chamber, a partition in said chamber dividing said chamber into two pressure compartments, a port in said partition, an axially movable diaphragm, said diaphragm being axially movable responsive to fluid pressure in said chamber, said diaphragm being positioned in one of said compartments and fixed to said partition over said port, a second port in said one of said compartments, a conduit connected to said second port and adapted for connection to a source of fluctuating fluid pressure, a third port, said third port being positioned in the wall of the other of said compartments, a second axially movable diaphragm, said second diaphragm being axially movable responsive to fluid pressure in said chamber, said second diaphragm being positioned in said other compartment in the wall of said chamber over the third port, a fourth port, said fourth port being positioned in said other compartment, a rod passing through the port over which said second diaphragm is mounted and connected to said second diaphragm, a by-pass conduit connected to the first-named conduit and the said fourth port, and means in said by-pass conduit for isolating said other compartment from the fluctuations of pressure in said first-named conduit, and means connected to said rod responsive to the movement of said rod on deflection of said diaphragms.

13. A pressure gauge, comprising a chamber, a partition in said chamber dividing said chamber into two pressure compartments, a port in said partition, an axially movable diaphragm, said diaphragm being axially movable responsive to fluid pressure in said chamber, said diaphragm being positioned in one of said compartments and fixed to said partition over said port, a second port in said one of said compartments, a conduit connected to said second port and adapted for connection to a source of fluctuating fluid pressure, a third port, said third port being positioned in the wall of the other of said compartments, a second axially movable diaphragm, said second diaphragm being axially movable responsive to fluid pressure in said chamber, said second diaphragm being positioned in said other compartment in the wall of said chamber over the third port, a fourth port, said fourth port being positioned in said other compartment, a rod passing through the port over which said second diaphragm is mounted and connecting said second diaphragm to said first diaphragm, means connected to both of said diaphragms and responsive to the deflection of each of said diaphragms for indicating the deflection of said diaphragms, a by-pass conduit connected to the first-named conduit and the said fourth port, and a valve in said by-pass conduit.

14. A pressure gauge, comprising a chamber, a partition in said chamber dividing said chamber into two pressure compartments, a port in said partition, an axially movable diaphragm, said diaphragm being axially movable responsive to fluid pressure in said chamber, said diaphragm being positioned in one of said compartments and fixed to said partition over said port, a second port in said one of said compartments, a conduit connected to said second port and adapted for connection to a source of fluctuating fluid pressure, a third port, said third port being positioned in the wall of the other of said compartments, a second diaphragm, said second diaphragm being axially movable responsive to fluid pressure in said chamber, said second diaphragm being positioned in said other compartment over the third port, a fourth port, said fourth port being positioned in said other compartment, a rod connecting said diaphragms, means connected to both of said diaphragms and responsive to the deflection of each of said diaphragms for indicating the deflection of said diaphragms, a by-pass conduit connected to the first-named conduit and the said fourth port, and a low-pass resistance capacitance pressure fluctuation choke in said by-pass conduit.

15. A pressure gauge, comprising a chamber, a diaphragm in said chamber, a port in the wall of said chamber positioned on one side of said diaphragm and adapted for connection to a source of fluid pressure, a second chamber, a second diaphragm in said second chamber, a port in said second chamber on one side of said second diaphragm and adapted for connection to the said source of fluid pressure, a fluid pressure communication between said second chamber on the said one side of said second diaphragm and the other side of said first diaphragm, a port in said second chamber on the other side of said second diaphragm, a mechanical connection between said diaphragms, an electrical wire resistance strain gauge comprising a frame, an armature, strain wires connected to said frame and armature, a mechanical connection between said armature and said second diaphragm, a conduit connected to the first-named port and adapted for connection to said source of fluid pressure, a by-pass conduit connected to the first-named conduit and the port in said second chamber positioned on the said one side of said second diaphragm, and means in said by-pass conduit for isolating said second chamber from the fluctuations of pressure in said first-named conduit.

16. A pressure gauge, comprising a chamber, a diaphragm in said chamber, a port in the wall of said chamber positioned on one side of said diaphragm and adapted for connection to a source of fluid pressure, a second chamber, a second diaphragm in said second chamber, a port in said second chamber on one side of said second diaphragm and adapted for connection to the said source of fluid pressure, a fluid pressure communication between said second chamber on the said one side of said second diaphragm and the other side of said first diaphragm, a port in said second chamber on the other side of said second diaphragm, a mechanical connection between said diaphragms, an electrical wire resistance strain gauge comprising a frame, an armature, strain wires connected to said frame and armature, a mechanical connection between said armature and said second diaphragm, a conduit connected to the first-named port and adapted for connection to said source of fluid pressure, a by-pass conduit connected to the first-named conduit and the port in said second chamber positioned on the said one side of said second diaphragm, and a valve in said by-pass conduit.

17. A pressure gauge, comprising a chamber, a diaphragm in said chamber, a port in the wall of said chamber positioned on one side of said diaphragm and adapted for connection to a source of fluid pressure, a second chamber, a second diaphragm in said second chamber, a port in said second chamber on one side of said second diaphragm and adapted for connection to the said source of fluid pressure, a fluid pressure communication between said second chamber on the said one side of said second diaphragm and the other side of said first diaphragm, a port in said second chamber on the other side of said second diaphragm, a mechanical connection between said diaphragms, an electrical wire resistance strain gauge comprising a frame, an armature, strain wires connected to said frame and armature, a mechanical connection between said armature and said second diaphragm, a conduit connected to the first-named port and adapted for connection to said source of fluid pressure, a by-pass conduit connected to the first-named conduit and the port in said second chamber positioned on the other side of said second diaphragm, and a low-pass resistance capacitance pressure fluctuation choke in said by-pass conduit.

18. A pressure gauge, comprising a chamber, a partition in said chamber dividing said chamber into two pressure compartments, a port in said partition, a bellows positioned in one of said compartments and fixed to said partition over said port, a second port in said last one of said compartments, a conduit connected to said second port and adapted for connection to a source of fluctuating fluid pressure, a third port, said third port being positioned in the wall of the other of said compartments, a second bellows in said other compartment positioned in the wall of said chamber over the third port, a fourth port, said fourth port being positioned in said other compartment, a rod connecting said bellows, a resistance strain wire gauge comprising a frame, an armature, strain wires positioned on said armature, a rod passing through the port over which said second bellows is mounted and connecting said second bellows to said armature, a by-pass conduit connected to the first-named conduit and the said fourth port, and means in said by-pass conduit for isolating said other of said compartments from the fluctuations of pressure in said first-named conduit.

19. A pressure gauge, comprising a chamber, a partition in said chamber dividing said chamber into two pressure compartments, a port in said partition, a bellows positioned in one of said compartments and fixed to said partition over said port, a second port in said one of said compartments, a conduit connected to said second port and adapted for connection to a source of fluctuating fluid pressure, a third port, said third port being positioned in the wall of the other of said compartments, a second bellows in said other compartment positioned in the wall of said chamber over the third port, a fourth port, said fourth port being positioned in said other compartment, a rod connecting said bellows, a resistance strain wire gauge comprising a frame, an armature, strain wires positioned on said armature, a rod passing through the port over which said second bellows is mounted and connecting said second bellows to said armature, a by-pass conduit connected to the said fourth port, and a valve in said by-pass conduit.

20. A pressure gauge, comprising a chamber, a partition in said chamber dividing said chamber into two pressure compartments, a port in said partition, a bellows positioned in one of said compartments and fixed to said partition over said port, a second port in said one of said compartments, a conduit connected to said second port and adapted for connection to a source of fluctuating fluid pressure, a third port, said third port being positioned in the wall of the other of said compartments, a second bellows in said other compartment positioned in the wall of said chamber over the third port, a fourth port, said fourth port being positioned in said other compartment, a rod connecting said bellows, a resistance strain wire gauge comprising a frame, an armature, strain wires positioned on said armature, a rod passing through the port over which said second bellows is mounted and connecting said second bellows to said armature, a by-pass conduit connected to the first-named conduit and the said fourth port, and a low-pass resistance capacitance pressure fluctuation choke in said by-pass conduit.

References Cited in the file of this patent

UNITED STATES PATENTS

| | | |
|---|---|---|
| 1,089,122 | Faught et al. | Mar. 3, 1914 |
| 1,532,705 | Levin | Apr. 7, 1925 |
| 1,716,472 | Tvestmann | June 11, 1929 |
| 1,729,289 | Ireland | Sept. 24, 1929 |
| 2,059,549 | Carlson | Nov. 3, 1936 |
| 2,298,168 | Robinson | Oct. 6, 1942 |
| 2,367,087 | Beecher | Jan. 9, 1945 |
| 2,452,799 | Speaker et al. | Nov. 2, 1948 |

FOREIGN PATENTS

| | | |
|---|---|---|
| 1,606 | Great Britain | May 16, 1868 |
| 15,937 | Great Britain | Nov. 11, 1915 |